Figure 1:
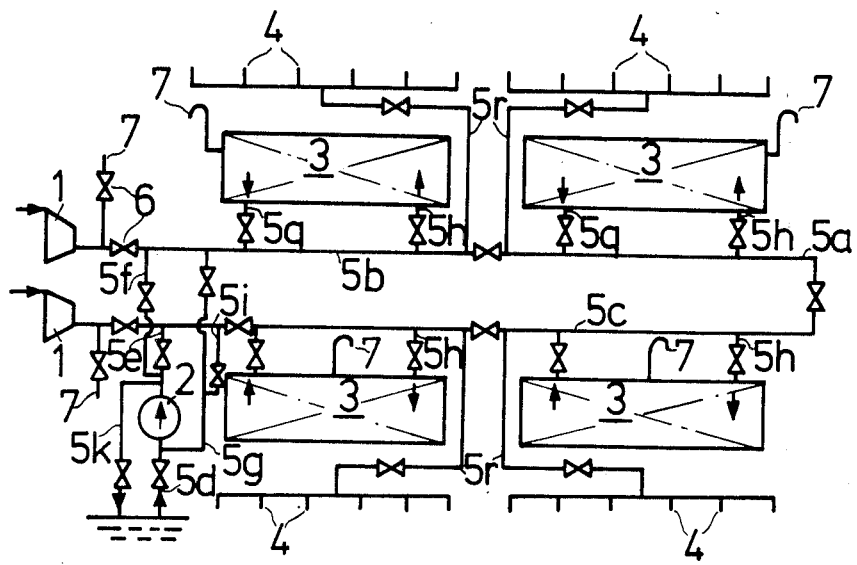

United States Patent [19]

Collins et al.

[11] Patent Number: 4,648,342

[45] Date of Patent: * Mar. 10, 1987

[54] ARRANGEMENT IN VESSELS

[75] Inventors: Geoff Collins, St. Catharines, Canada; Kimmo Juurmaa, Vantaa, Finland

[73] Assignee: Oy Wartsila Ab, Helsinki, Finland

[*] Notice: The portion of the term of this patent subsequent to Oct. 15, 2002 has been disclaimed.

[21] Appl. No.: 786,820

[22] Filed: Oct. 11, 1985

Related U.S. Application Data

[63] Continuation of Ser. No. 577,303, Feb. 6, 1984, Pat. No. 4,546,719, which is a continuation of Ser. No. 322,935, Nov. 19, 1981, abandoned.

[30] Foreign Application Priority Data

Feb. 10, 1981 [CA] Canada .................................. 370510

[51] Int. Cl.$^4$ .......................... B63B 1/38; B63B 35/08
[52] U.S. Cl. .................................. 114/40; 114/67 A; 114/121; 114/125
[58] Field of Search ............... 114/40, 67 A, 121, 122, 114/125, 74 R, 41

[56] References Cited

U.S. PATENT DOCUMENTS

| | | | |
|---|---|---|---|
| 3,922,985 | 12/1975 | Hamilton | 114/74 R |
| 4,029,035 | 6/1977 | German | 114/40 |
| 4,314,519 | 2/1982 | Yunoki et al. | 114/125 |
| 4,522,141 | 6/1985 | Aker | 114/40 |
| 4,546,719 | 10/1985 | Collins et al. | 114/421 X |

Primary Examiner—Galen L. Barefoot
Assistant Examiner—Edwin L. Swinehart
Attorney, Agent, or Firm—McAulay, Fields, Fisher, Goldstein & Nissen

[57] ABSTRACT

A vessel with a ballast system including a plurality of ballast tanks provided with means for feeding water into the tanks and expelling water therefrom and an air bubbling system including underwater openings and means for blowing air through said openings into the water surrounding said vessel. The ballast system and the air bubbling system include a common tube system being alternatively connectable to the ballast tanks, for operating the filling and emptying of the tanks, and to the air bubbling system for conducting air to the underwater openings as described in U.S. Pat. No. 3,580,204.

24 Claims, 6 Drawing Figures

ARRANGEMENT IN VESSELS

This is a continuation of application Ser. No. 577,303, now U.S. Pat. No. 4,546,719, filed Feb. 6, 1984, which is a Rule 62 continuation of application Ser. No. 322,935 filed Nov. 19, 1981, now abandoned.

The invention relates to a vessel having a ballast system including a plurality of ballast tanks and means for feeding water into said tanks and expelling water therefrom.

In this specification and in the claims the term ballast system also includes so called stripping system and other similar systems for feeding and/or expelling relatively great amounts of water into and from, respectively, tanks on board a floating structure.

It is known to use in vessels moving in ice-filled waters an air bubbling system according to U.S. Pat. No. 3,580,204 for increasing the performance of the vessel in ice. It is obvious that the installation of an air bubbling system of the kind referred to involves considerable costs because large air blowing tubes have to be installed in the vessel. The air bubbling system is used mainly under severe ice conditions but, for instance, when the vessel is loading or unloading cargo in a harbour or when the vessel is moving in free water, the air bubbling system is usually not used with the exception of some occasional use for manouvering the vessel.

An object of the invention is to reduce the costs for the air bubbling system by using it partly for other purposes as well. In a vessel according to the invention, a ballast system of the kind referred to in the first paragraph is combined with an air bubbling system including under water openings in the hull of said vessel and means for blowing air through said openings into the water surrounding said hull. The ballast system and the air bubbling system include a common tube system being alternatively connectable to said ballast tanks for operating the filling and emptying of one or several of said tanks, and to said air bubbling system for conducting air to said underwater openings. Since there are extremely seldom occasions calling for simultaneous use of the ballast system and the air bubbling system, this solution is almost ideal because it saves considerable costs without causing any important limitations of the use of either of the two systems.

In order to control the use of the two combined systems there should be a valve system controlling various branches of said common tube system. The valve system is preferably remote controlled, for instance, a hydraulic system of a kind known per se can be used. A fluid operated valve control system can receive its power from one or several drive motors also providing power for producing compressed air, when so desired, for said air bubbling system.

The combination of the ballast system with the air bubbling system further gives the advantage that in case of a hull rupture the combined system can be used for blowing compressed air to ballast tanks in said vessel in order to prevent the ambient water from penetrating into said tanks.

The invention can be used in many different types of floating structures moving in ice-filled waters. In particular the invention is intended for use in cargo or other ships having a substantial length and being provided with a relatively great number of ballast tanks, which means that the ballast system has to include tubes of considerable length. Typical for the main tube of a ballast system is a tube diameter of 400 . . . 600 mm. A tube serving only one ballast tank may have a diameter of 200 . . . 300 mm. For safety reasons two ballast pumps and two air compressors are usually installed. The pumping power required is usually small compared to the air blowing power required, in many cases just one tenth thereof. The power of the air bubbling system is usually, for normal cargo ships, 300 . . . 600 kW, for ice-breakers considerably higher.

Figure 2:
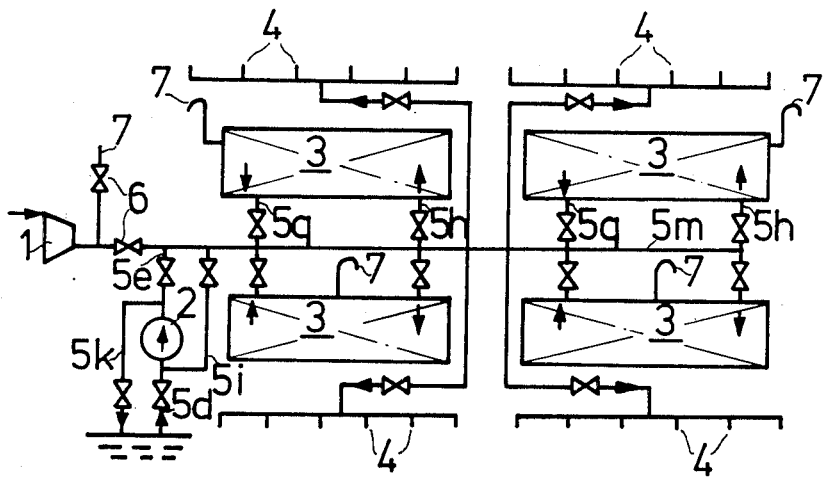
Figure 3:
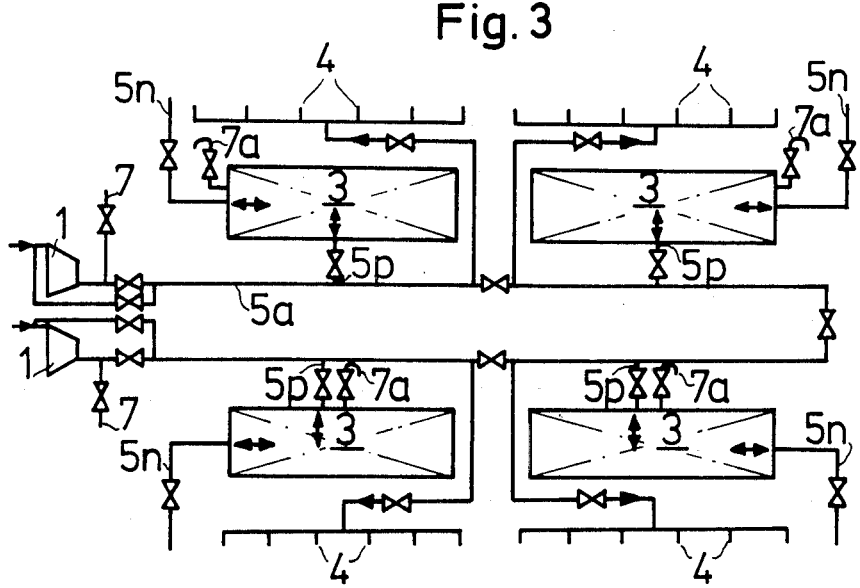
Figure 4:
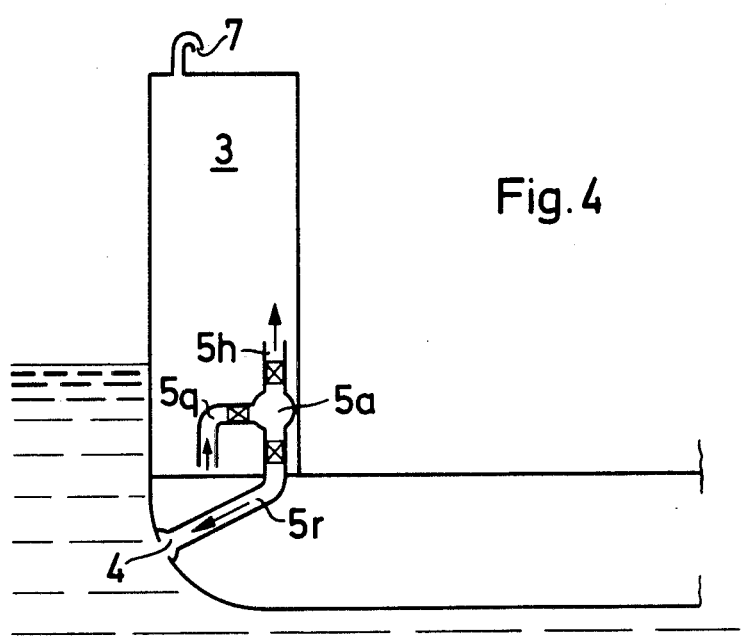
Figure 5:
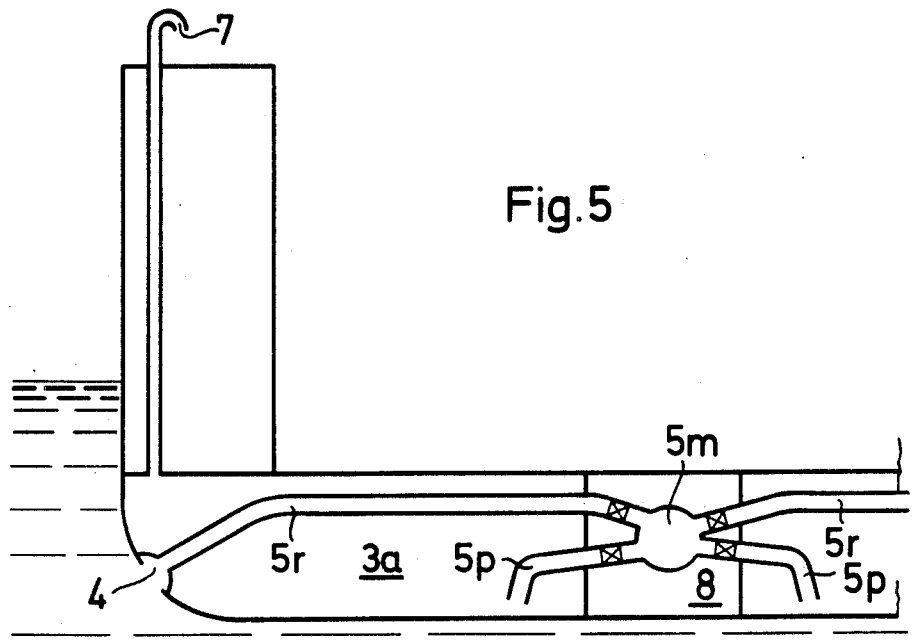
Figure 6:
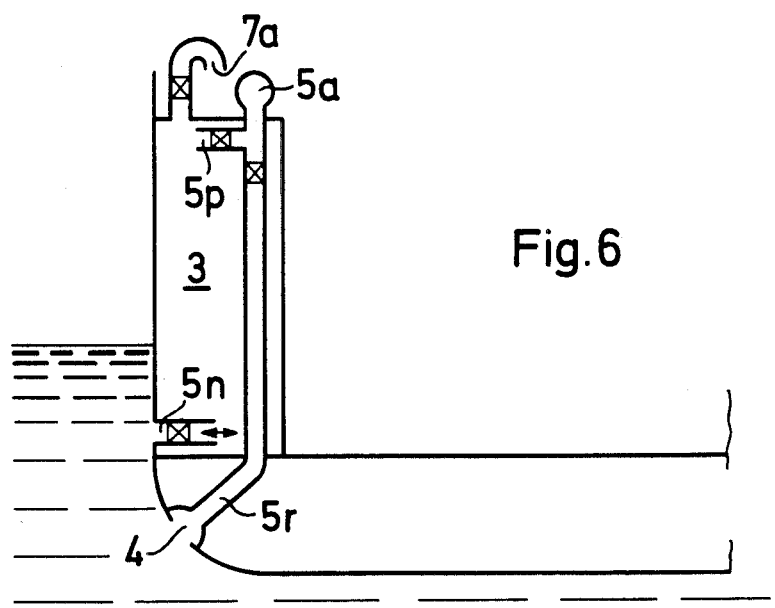

In the following, the invention will be described more in detail with reference to the attached drawing, in which FIG. 1 shows a schematic plan of a first embodiment of an arrangement according to the invention, FIG. 2 shows a modification of the plan shown in FIG. 1, FIG. 3 shows a modification of the arrangements shown in FIGS. 1 and 2, FIG. 4 shows a cross section of a part of a vessel provided with an arrangement according to the invention, FIG. 5 shows a cross section of a part of a vessel provided with a second embodiment of an arrangement according to the invention, FIG. 6 shows a cross section of a part of a vessel provided with a third embodiment of an arrangement according to the invention.

In the drawings, reference numeral 1 indicates air blowing compressors, 2 a ballast pump, 3 ballast tanks and 4 manifold tubes for blowing out air into the water surrounding the hull of the vessel. The different units shown are interconnected by means of tubes generally indicated by 5. These tubes are provided with a great number of valves generally indicated by 6.

FIG. 1 shows an embodiment of the invention in which both sides of a vessel have separate ballast tanks and air blowing systems interconnected by means of a main tube 5a forming a loop with two parallel branches 5b and 5c running in the longitudinal direction of the vessel. Connections to the atmosphere are generally indicated by 7. As evident from the drawing the system shown can be used at one side of the vessel only, if so required.

Ballast tanks 3 are filled with water by means of ballast pump 2 expelling water from the sea through tube 5d and pumping it through tube 5e and main tube branch 5c to the parallel main tube branch 5b, or alternatively, simultaneously through tubes 5e and 5f to both parallel branches 5b and 5c of main tube 5a. From main tube 5a the water flows through ballast tank inlet tubes 5h to ballast tanks 3. Draining of ballast tanks 3 is performed through tubes 5q, main tube 5a, tube branch 5i or 5t and tube 5g connected to the suction side of ballast pump 2. In this case, the valves in tubes 5e and 5f are closed and the water from ballast tanks 3 is pumped out into the sea through tube 5k. When using the system some of the valves generally indicated by 6 should be open and other should be shut. The opening and closing of the valves is not described in detail, because it is evident from the flow schemes shown in the drawing which of the valves should be open and which of the valves should be closed if a certain flow is desired. All the valves are preferably remote controlled.

If the air blowing system is to be used, air is compressed in air compressors 1 and led through main tube branches 5b and 5c to branch tubes 5r and further to manifold tubes 4. By way of example four manifold tubes are shown in the drawings, each of which can be used separately. Of course, the number of manifold tubes in a system according to the invention is not limited to four.

The system shown in FIG. 1 can be simplified by leaving out tube branches 5f and 5i. Alternatively, branch 5e and the portion of branch 5g which is closer to main tube 5b can be left out. Both measures will somewhat reduce the operability of the system. The shown embodiment can also be used for transferring ballast water from one ballast tank to another.

In the embodiment of the invention shown in FIG. 2, only one central tube 5m is used. This tube is preferably located to a central tunnel in the double bottom of the vessel. This system works substantially in the same way as the system shown in FIG. 1. Only one air blowing compressor 1 is used, which is, of course, also possible in the embodiment shown in FIG. 1. The ballast pump 2 and tube branches 5d, 5e, 5i and 5k have the same function as in the embodiment shown in FIG. 1. Also other details having the same reference numeral work in the same way in both embodiments.

FIG. 3 shows an embodiment in which no ballast pump is used. Instead the pressure produced by the air blowing compressors 1 are used to obtain filling and emptying of ballast tanks 3. In order to make this possible, each ballast tank must be provided with a combined filling and emptying tube 5n being in connection with the ambient sea water. When the pressure side of air compressors 1 through main tube 5a and a branch tubes 5p is connected to a ballast tank 3, the pressure will press the water out from the ballast tank through tubes 5n. If the suction side of air compressor 1 is through the same tubes connected to a ballast tank 3, water is sucked into the ballast tank through tubes 5n. Other details of the system are as shown in FIGS. 1 and 2.

Naturally, the embodiment shown in FIG. 3 can be modified in accordance with what is shown in FIG. 2, so that only one air compressor 1 and one central tube 5m is used. Also in the embodiment shown in FIG. 3 only one air compressor can be used. It should be noted that in an embodiment based on the principle shown in FIG. 3 the ballast tank vents 7a have to be provided with closure valves.

FIG. 4 shows more in detail a practical realization of the invention. The figure shows a cross section of a part of a vessel provided with an arrangement according to the invention. In this embodiment, main pipe 5a is located inside ballast tanks 3. It could of course also be located outside the tanks, for instance, on the deck of the vessel, if otherwise suitable. Main tube 5a is connected to each ballast tank 3 by means of at least one branch tube 5q, which, if only one branch tube is used should be so arranged that it can be used for filling as well as for emptying of the ballast tank. A faster filling can be obtained, if there is a separate filling tube branch 5h as also shown in FIGS. 1 and 2. The tube branch 5r leads from main tube 5a to air blowing manifold tubes 4. The tank vent is indicated by 7 as in FIGS. 1 and 2.

FIG. 5 shows another embodiment combining features of the embodiments shown in FIGS. 2 and 3. Only one central main tube 5m is used located to a central tunnel 8 in the double bottom of the vessel. The ballast water is in this embodiment a bottom tank 3a provided with a tank vent 7. There is only one combined filling and emptying tube branch 5p as in FIG. 3. Tube branch 5r is an air blowing tube leading to air blowing manifold 4.

FIG. 6 shows an embodiment corresponding to FIG. 3. Main tube 5a is located on deck. It is provided with branch tubes 5r leading to air blowing manifolds 4 and branch tubes 5p providing suction or overpressure in ballast tanks 3. Water is expelled directly from the sea or pressed out into the sea through a separate tube 5n. Tank vent 7a is provided with a closure valve as in FIG. 3.

The invention is not limited to the embodiments shown, but several modifications thereof are feasible within the scope of the attached claims.

We claim:

1. In a vessel having a hull with underwater openings, an air bubbling system for blowing out air through said underwater openings, a ballast system comprising a plurality of interconnected ballast tanks and means for feeding water into said tanks and means for expelling water from said tanks by means of pumping;

said ballast system being combined with said air bubbling system;

said combined ballast system and said air bubbling system being operatively associated and including a common tube system extending longitudinally in said vessel and being alternatively connectable to said ballast tanks for pumping water to or from one or several of said tanks and connectable to said air bubbling system for conducting air to said underwater openings, said tube system having a plurality of branches;

a valve system controlling said branches of said tube system, said valve system being a remote controlled system; and, means for providing power to said remote controlled system, to said pumping water means and to means for producing compressed air for said air bubbling system.

2. In the vessel as claimed in claim 1, including one or several air compressors for said air bubbling system, said air compressors being connectable for operating said ballast system by providing pressure or suction in pressure and suction tubes, respectively, arranged to operate said ballast system.

3. In the vessel as claimed in claim 1, including an air compressor connected to said tube system to blow compressed air to said ballast tanks in said vessel as a salvage operation in case of hull rupture.

4. In the vessel as claimed in claim 1, in which said common tube system includes two main tubes extending along a substantial part of the length of the vessel, said main tubes being connected or connectable to each other.

5. In the vessel as claimed in claim 4, in which each of said two main tubes is connectable to serve the ballast system and the air bubbling system at one side of said vessel irrespective of the operation of the corresponding systems at the opposite side of said ship.

6. In the vessel as claimed in claim 4, in which said ballast system includes at least one ballast pump having a pressure side and a suction side, said pressure side being connected to one of said main tubes and said suction side being connected to the other of said main tubes.

7. In the vessel as claimed in claim 4, in which said two main tubes are interconnectable at both ends by means of a valve controlled connection tube.

8. In the vessel as claimed in claim 6, in which said pressure side of said ballast pump and said suction side of said pump are connected to both said main tubes by means of valve controlled connection tubes.

9. In the vessel as claimed in claim 1, in which said common tube system comprises only one main tube extending past a majority of the ballast and air bubbling systems in the longitudinal direction of the vessel, said main tube being provided with valve controlled branch tubes connected to said ballast and air bubbling systems.

10. In a vessel having a hull with an air bubbling system, said system including underwater openings, a ballast system having several interconnected ballast tanks with openings to ambient sea through at least one of said underwater openings;
   valve means for feeding water into said tanks and water pumping means at least for expelling water from said tanks;
   said ballast system being operatively associated with said air bubbling system, and including a common tube system extending longitudinally in said vessel and having a plurality of branches, said common tube system being alternatively connectable to said ballast system and to said air bubbling system;
   said air bubbling system communicating with other of said underwater openings in said hull;
   means for feeding compressed air through said common tube system to said other underwater openings;
   said common tube system being connectable to said ballast tanks at least for emptying one or several of said tanks by means of pumping water;
   a remotely controlled valve system controlling said branches of said tube system; and
   means for providing power to said remote controlled system, to said pumping water means and to means for producing compressed air for said air bubbling system.

11. In the vessel as claimed in claim 10, wherein said common tube system is connectable to said air bubbling system for blowing compressed air to said ballast tanks to prevent ambient water from penetrating thereinto.

12. In the vessel of claim 10, further including an air compressor connected to said common tube system and connectable to said ballast system and said air bubbling system to blow compressed air to said ballast tanks in said vessel as a salvage operation in case of hull rupture.

13. In the vessel as claimed in claim 10, in which said ballast system includes at least one ballast pump having a pressure side and a suction side, and pressure side and said suction side being connected to said common tube system.

14. In the vessel as claimed in claim 10, including a compressor having a pressure side and a suction side connected with said common tube system for blowing a compressible fluid selectively into said ballast system and said air bubbling system.

15. In the vessel as claimed in claim 10, in which said common tube system includes a main tube located in said ballast tanks.

16. In the vessel as claimed in claim 10, in which said tube system includes two main tubes extending along a substantial part of the length of the vessel in said hull, said main tubes being connected or connectable to each other, each of said two main tubes being connectable to serve the ballast system and the air bubbling system at one side of said vessel irrespective of the operation of the corresponding systems at the opposite side of said ship, and a ballast pump and an air compressor is provided for each of said main tubes.

17. In the vessel as claimed in claim 16, in which said two main tubes are interconnectable at both ends by means of a valve-controlled connection tube.

18. In the vessel as claimed in claim 16, in which said ballast pump has a pressure side and a suction side, and said pressure side of said ballast pump and said suction side of said pump are connected to both said main tubes by means of valve-controlled connection tubes.

19. In the vessel as claimed in claim 10, in which said common tube system comprises only one tube extending past said ballast and air bubbling systems in the longitudinal direction of the vessel, said main tube being provided with valve controlled branch tubes connected to said ballast and air bubbling systems, and one or several air compressors for said air bubbling system, and air compressors being connectable for operating said ballast system by providing pressure or suction in pressure and suction tubes, respectively, arranged to operate said ballast system.

20. In the vessel of claim 10, further including a central tunnel in a double bottom of the vessel, said common tube system including one central main tube located in said central tunnel.

21. In the vessel as claimed in claim 20, including a compressor having a pressure side and a suction side connected with said common tube system for blowing a compresible fluid selectively into said ballast system and said air bubbling system.

22. In the vessel as claimed in claim 21, wherein said compressible fluid is air, whereby said air when blown into said ballast tanks is effective to prevent ambient water from penetrating thereinto in case of hull rupture.

23. In the vessel as claimed in claim 22, including an inlet-exhaust tube for each said ballast tank for connection thereof with ambient sea water outside the vessel, means connecting the suction side of said compressor to said common tube system for aspirating water into said ballast tanks through said inlet-exhaust tube, and a vent with a closure valve for each of said ballast tanks.

24. In a vessel adapted for moving in ice filled waters, said vessel having a hull with an air bubbling system including underwater openings in said hull, and a ballast system including several ballast tanks and means for feeding water to said tanks and for expelling water from said tanks by means of pumping;
   a common tube system extending longitudinally in said vessel and being associated with each of said tanks and alternatively connectable with said air bubbling system and said ballast system;
   said air bubbling system including air compressor means for blowing air through said openings into the water surrounding the vessel after first being conveyed thereto through said common tube system; and
   said ballast system including pumping means associated with said ballast tanks at least for expelling water from said tanks through said common tube system by means of pumping said water.

* * * * *